United States Patent
Ohta et al.

(10) Patent No.: US 8,553,175 B2
(45) Date of Patent: Oct. 8, 2013

(54) OPTICAL SHEET HAVING IRREGULARITY PORTIONS, BACKLIGHT DEVICE WITH OPTICAL SHEET, AND LIQUID CRYSTAL DISPLAY DEVICE INCLUDING A BACKLIGHT DEVICE WITH OPTICAL SHEET

(75) Inventors: Eiji Ohta, Miyagi (JP); Toru Abiko, Miyagi (JP); Masato Ishigaki, Miyagi (JP); Satoshi Sato, Miyagi (JP); Yasuhiro Nishida, Miyagi (JP); Akihiro Horii, Miyagi (JP)

(73) Assignee: Sony Corporation, Tokyo (JP)

( * ) Notice: Subject to any disclaimer, the term of this patent is extended or adjusted under 35 U.S.C. 154(b) by 1072 days.

(21) Appl. No.: 11/735,810

(22) Filed: Apr. 16, 2007

(65) Prior Publication Data
US 2007/0242479 A1 Oct. 18, 2007

(30) Foreign Application Priority Data
Apr. 14, 2006 (JP) ................ P2006-112388

(51) Int. Cl.
G09F 13/08 (2006.01)
F21V 5/02 (2006.01)
G02F 1/1335 (2006.01)

(52) U.S. Cl.
USPC ........... 349/61; 349/62; 349/95; 362/97.2; 362/339

(58) Field of Classification Search
USPC ......... 349/61–62, 64, 57, 95; 362/97.1–97.3, 362/333, 339, 627
See application file for complete search history.

(56) References Cited

U.S. PATENT DOCUMENTS

| 5,926,033 | A | * | 7/1999 | Saigo et al. | 362/600 |
|---|---|---|---|---|---|
| 6,280,063 | B1 | | 8/2001 | Fong et al. | |
| 6,472,046 | B1 | * | 10/2002 | Kubo et al. | 428/141 |
| 6,478,438 | B1 | * | 11/2002 | Ishikawa et al. | 362/620 |
| 7,326,448 | B2 | * | 2/2008 | Jones et al. | 428/1.1 |
| 7,384,173 | B2 | * | 6/2008 | Whitney | 362/330 |
| RE41,566 | E | * | 8/2010 | Suzuki et al. | 349/112 |
| 2003/0235704 | A1 | * | 12/2003 | Akatsu et al. | 428/482 |
| 2005/0151894 | A1 | * | 7/2005 | Katsuda et al. | 349/58 |
| 2007/0115407 | A1 | * | 5/2007 | Richard et al. | 349/112 |
| 2008/0094845 | A1 | * | 4/2008 | Kusano et al. | 362/339 |

FOREIGN PATENT DOCUMENTS

| JP | HEI 07-230001 | 8/1995 |
|---|---|---|
| JP | HEI 11-160504 | 6/1999 |
| JP | 2001-524225 | 11/1999 |
| JP | 2000-294019 | 10/2000 |

(Continued)

OTHER PUBLICATIONS

Japanese Office Action dated Jun. 21, 2011, for corresponding Japanese Appln. No. 2006-112388.

(Continued)

Primary Examiner — Uyen Chau N Le
Assistant Examiner — Michael Mooney
(74) Attorney, Agent, or Firm — K&L Gates LLP (57) ABSTRACT

An optical sheet, a backlight device, and a liquid crystal display device are provided. The beam-condensing optical sheet includes a large number of irregularity portions arranged on one main surface of a light-transmissive base, in which a pitch of arrangement of the irregularity portions is 110 μm or more and 330 μm or less, and surface roughness (Ra) of the irregularity portion is 0.1 μm or less.

16 Claims, 10 Drawing Sheets

(56) References Cited

FOREIGN PATENT DOCUMENTS

| | | |
|---|---|---|
| JP | 2001524225 | 11/2001 |
| JP | 2002-258019 | 9/2002 |
| WO | WO 2006022270 A1 * | 3/2006 |
| WO | 2006/036029 A1 | 4/2006 |
| WO | 2006/036032 A1 | 4/2006 |

OTHER PUBLICATIONS

Japanese Patent Office, Decision of refusal issued in connection with Japanese Patent Application No. 2006-112388, dated Jul. 31, 2012. (4 pages).

* cited by examiner

| PITCH [μm] (Lp) | 100 | 110 | 160 | 200 | 250 | 300 | 330 | 350 | 400 | 450 |
|---|---|---|---|---|---|---|---|---|---|---|
| HEIGHT [μm] (Lh) | 45 | 49.5 | 72 | 90 | 112.5 | 135 | 148.5 | 157.5 | 180 | 202.5 |
| BASE THICKNESS [μm] (Lt) | TOTAL SHEET THICKNESS (Lh+Lt) | | | | | | | | | |
| 200 | 245 | 249.5 | 272 | 290 | 312.5 | 335 | 348.5 | 357.5 | 380 | 402.5 |
| 300 | 345 | 349.5 | 372 | 390 | 412.5 | 435 | 448.5 | 457.5 | 480 | 502.5 |
| 400 | 445 | 449.5 | 472 | 490 | 512.5 | 535 | 548.5 | 557.5 | 580 | 602.5 |
| BASE THICKNESS [μm] | Lh/Lt | | | | | | | | | |
| 200 | 0.183673 | 0.198397 | 0.264706 | 0.310345 | 0.36 | 0.402985 | 0.426112 | 0.440559 | 0.473684 | 0.503106 |
| 300 | 0.130435 | 0.141631 | 0.193548 | 0.230769 | 0.272727 | 0.310345 | 0.331104 | 0.344262 | 0.375 | 0.402985 |
| 400 | 0.101124 | 0.110122 | 0.152542 | 0.183673 | 0.219512 | 0.252336 | 0.270738 | 0.282511 | 0.310345 | 0.3361 |

| WAVINESS | | | | | | | | | | | |
|---|---|---|---|---|---|---|---|---|---|---|---|
| BASE THICKNESS [μm] | 200 | ○ | ○ | ○ | ○ | ○ | ○ | ○ | △ | △ | × |
| | 300 | ○ | ○ | ○ | ○ | ○ | ○ | ○ | ○ | ○ | ○ |
| | 400 | ○ | ○ | ○ | ○ | ○ | ○ | ○ | ○ | ○ | ○ |

| HAZE [%] | 2 | 10 | 20 | 25 | 30 |
|---|---|---|---|---|---|
| DECREASE IN LUMINANCE | NO | NO | NO | YES | YES |
| WAVINESS, STICKING | ○ | ○ | ○ | ○ | ○ |
| SCRATCHING UNDER VIBRATION TEST | △ | ○ | ○ | ○ | ○ |

OPTICAL SHEET HAVING IRREGULARITY PORTIONS, BACKLIGHT DEVICE WITH OPTICAL SHEET, AND LIQUID CRYSTAL DISPLAY DEVICE INCLUDING A BACKLIGHT DEVICE WITH OPTICAL SHEET

CROSS REFERENCES TO RELATED APPLICATIONS

The present application claims priority to Japanese Patent Application JP 2006-112388, filed in the Japan Patent Office on Apr. 14, 2006, the entire contents of which is being incorporated herein by reference.

BACKGROUND

The present application relates to a light-transmissive optical sheet typically used as a functional film for liquid crystal display devices, and a backlight device and a liquid crystal display device provided with the same.

Liquid crystal displays (LCD) devices have larger potentials of reduction in power consumption, downsizing and thinning as compared with cathode ray tubes (CRT), and those of a variety of sizes are widely applied at present to small-sized instruments such as mobile phones and digital cameras, up to large-sized liquid crystal television sets.

The liquid crystal display devices are classified into those of transmission type and reflection type. In particular, the transmission type liquid crystal display device has a liquid crystal display panel composed of a liquid crystal layer held between a pair of transparent substrates and a backlight unit as a light source for illumination. The backlight unit is classified into those of direct backlight having a light source disposed directly next to the liquid crystal display panel, and those of edge-light type.

In the backlight unit used for the liquid crystal display devices, beam-condensing optical sheets or films (generally referred to as "sheets", unless otherwise specifically noted) such as prism sheets or lens sheets aimed at aligning the direction of emission of light from the light source to the front direction are generally used so as to improve front luminance. See Japanese translations of PCT international publication for patent application No. 2001-524225.

In recent years in the field of liquid crystal display devices, there have been advancing trends in improvement in quality of displayed image. Improvement in the luminance is indispensable for improving the image quality. There is, therefore, a demand of further improving the luminance characteristics of the beam-condensing optical sheets represented by the prism sheet.

In the field of liquid crystal TV in recent years, there have been increasing trends in expanding the screen size, and this consequently demands increase in the size of the beam-condensing optical sheets represented by the prism sheet. The optical sheets only as thick as those generally used will, however, fail in obtaining necessary levels of rigidity or stiffness, when the screen size grows up to 50 inches or larger, resulting in deflection and making proper handling difficult. It is also anticipated that lowering in the rigidity of the optical sheets may degrade workability in assembly of backlight devices or liquid crystal display devices, and may make it more likely to cause deflection (waviness) due to heat of the backlight, and this may cause disturbance in the beam-condensing characteristics, and may consequently degrade the image quality.

SUMMARY

In an embodiment an optical sheet, a back-light device and a liquid crystal display device, capable of further improving the luminance characteristics, and capable of coping with expansion of the screen size is provided.

According to an embodiment, there is provided a beam-condensing optical sheet having a large number of irregularity portions continuously arranged on one main surface of a light-transmissive base, wherein the pitch of arrangement of the irregularity portions is 110 μm to 330 μm, both ends inclusive, and the surface roughness (Ra) of the irregularity portion is 0.1 μm or less.

In an embodiment, each irregularity portion may be configured by a prism component having a triangle sectional geometry, or a cylindrical lens component having a hyperbolic plane, a parabolic plane, or an aspherical plane of higher orders. High luminance characteristics will be obtained by configuring these prism components or lens components while adjusting the pitch of arrangement (generally referred to as "lens pitch", hereinafter) to 110 μm to 330 μm, both ends inclusive, and adjusting the surface roughness (Ra: arithmetical mean roughness) of the irregularity portion to 0.1 μm or less, and high quality of displayed image will be obtained by applying the optical sheet to liquid crystal display devices or to backlight devices.

It is found that a larger lens pitch is more successful in improving the luminance characteristics. In the optical sheet according to the embodiment, the lens pitch of smaller than 110 μm results in only a small ratio of elevation in the luminance and in insufficient luminance characteristics, as compared with the case having no optical sheet used therein. On the other hand, the lens pitch exceeding a certain level will result in saturation in the ratio of elevation of luminance, and degradation in the rigidity of the sheet becomes more distinct. More specifically, the lens pitch exceeding 330 μm largely suppresses rate of elevation of luminance, and degrades the handlability due to insufficient rigidity of the sheet. This trend becomes more distinctive as the sheet size enlarges.

The surface roughness of the irregularity portion largely affects alignment characteristics of emitted light, wherein the front luminance weakens as the surface roughness becomes large. This trend becomes more distinctive as the lens apex becomes more acute. By adjusting the surface roughness (Ra) of lens surface to 0.1 μm or smaller, and more preferably 0.05 μm or smaller, the front luminance can successfully be prevented from lowering.

The geometry of the lens composing the irregularity portion may be that of prism as described in the above, or may be that of cylindrical lens. In particular, by composing the end portion (apex) of the lens with a predetermined geometry, the angle of view can be improved while keeping a certain level or above of front luminance.

More specifically, the lens is configured so as to satisfy the relation of $a/Lp \leq 0.18$, assuming the width of chord of the end portion of the lens as "a", and the lens pitch as Lp. By adjusting the width of chord of the end portion of the lens to 18% or less of the lens pitch, as expressed in the above, it is possible to improve the angle of view while keeping a certain level or above of front luminance.

The "width of chord" herein means, for a case where the lens has a prism geometry, the length of a line connecting, in the width-wise direction, both intersections respectively formed by straight lines composing the slopes of the prism and a curve composing the curved surface of the end portion, and in particular for a case where the curved surface of the end portion is composed of a spherical surface, this means doubled radius of the curvature. For another case where the lens has cylindrical lens geometry, this means doubled radius of curvature of the spherical surface of the end portion.

For the case where the curved surface of the end portion of the lens is composed of a spherical surface, the lens is configured so as to satisfy the relation of R/Lh≦0.40, assuming the radius of curvature as R, and the lens height as Lh. By adjusting the radius of curvature of the end portion of the lens to 40% or less of the lens height, it is possible to improve the angle of view while keeping a certain level or above of front luminance.

On the other hand, increase in the lens pitch while keeping the lens geometry unchanged results in increase in the lens height, and also results in increase in the ratio of lens height to the base thickness, if the base thickness is kept unchanged. In this case, the sheet as a whole lowers its rigidity, in particular the rigidity in the direction of lens width, as the lens pitch grows larger, becomes more likely to bend, and consequently lowers it handlability. Bending of the sheet can be suppressed by limiting the ratio of height (lens height) to the base thickness of the sheet. The lens height is preferably limited to 50% or smaller of the base thickness, making it possible to afford expansion of the sheet size.

If difficulty arises, as the lens pitch expands, in forming the entire range of base thickness sufficient for supporting the lenses by a single layer, it is effective to compose the base using a stack of two or more layers of light-transmissive sheet. For example, the base is composed of a first sheet base supporting the lenses, and a second sheet base opposed to the first sheet base while placing an adhesive material layer in between. In this case, the optical sheet having a necessary level of rigidity can readily be obtained, by configuring the sheet so that a substantial portion of the total thickness thereof is accounted for the thickness of the second sheet base, or so that the thickness values of the first and second sheet bases are properly combined.

In contrast to this, another technical means for avoiding lowering in the rigidity of sheet caused by expansion of the lens pitch relates to provision of a reinforcing portion keeping the flatness of the base, at least at a part of the circumference of the base which supports the lenses. The reinforcing portion may be configured as a reinforcing component attachable to the upper rim of the base, when the optical sheet is in service. The reinforcing component may otherwise be configured as a frame surrounding the entire circumference of the base, but is preferably configured to be attached only to the upper rim of the base. In this configuration, the sheet is effectively prevented from causing deformation such as deflection and waviness due to heat of a back-light, by configuring engagement portions which are formed on a part of the circumference of the sheet and are used for attaching the optical sheet inside a back-light device or inside a liquid crystal display device, using the reinforcing component described in the above.

Additional features and advantages are described herein, and will be apparent from, the following Detailed Description and the figures.

BRIEF DESCRIPTION OF THE FIGURES

FIGS. 2A and 2B are perspective views of exemplary configurations of a beam-condensing sheet as the optical sheet according to embodiments of the present invention, in which

FIGS. 12A and 12B are drawings showing an exemplary reinforcing structure of the beam-condensing sheet, wherein

DETAILED DESCRIPTION

A detailed description of various embodiments follows including reference to the figures.

Figure 1:
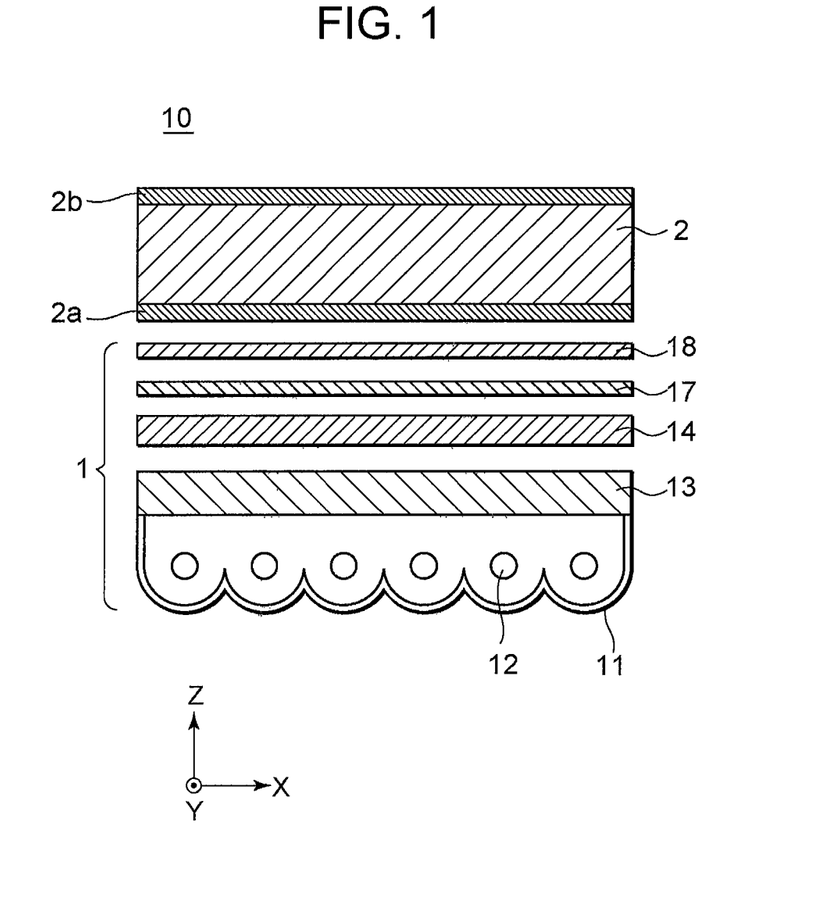
FIG. 1 is a schematic sectional view showing an overall configuration of the liquid crystal display device according to an embodiment of the present invention.

FIG. 1 is a sectional view schematically showing an exemplary configuration of a liquid crystal display device 10 according to one embodiment of the present invention. First, the configuration of the liquid crystal display device 10 will schematically be described.

As shown in FIG. 1, the liquid crystal display device 10 has a backlight unit 1 and a liquid crystal display panel 2. The backlight unit 1, expressed as direct backlight type in this example, may be of the edge-light type.

As shown in FIG. 1, the backlight unit 1 is to supply adjusted light to the liquid crystal display panel 2, and is provided directly next to the back surface of the liquid crystal display panel 2. The liquid crystal display panel 2 displays thereon information by modulating light supplied from the backlight unit 1 in time-dependent and space-dependent manner. The liquid crystal display panel 2 has polarizer plates 2a, 2bprovided respectively on both surfaces thereof. The polarizer plate 2a and the polarizer plate 2b allow only one of orthogonal polarization components of the incident light to pass therethrough, and intercept the other by absorption. The polarizer plate 2a and the polarizer plate 2b are provided typically so as to cross the transmission axes thereof normal to each other.

The liquid crystal display panel 2 has a plurality of pixels arranged at a predetermined pitch in the transverse direction and in the longitudinal direction of the panel, and allows display of a predetermined image on the front side thereof, by pixel-wise control of transmissivity of light illuminated by the backlight unit 1. The image displayed herein is a color image, but is of course not limited thereto.

As shown in FIG. 1, the backlight unit 1 typically has a reflector plate 11, a light source 12, a diffusion plate 13, a beam-condensing sheet 14, a diffusion sheet 17 and a reflection-type polarizer 18. Provision of any other optical elements besides these components is allowable. The diffusion plate 13, the diffusion sheet 17, and the reflection-type polarizer 18 may be omitted or altered in the order of arrangement as the occasion demands.

The light source 12 is to supply light to the liquid crystal display panel 2, a plurality of which being provided in the illustrated example, and is typically composed of fluorescent lamps (FL), electro-luminescence (EL) elements, light emitting diodes (LED) or the like.

The reflector plate 11 is provided so as to cover the bottom side and lateral sides of the light source 12, and is to reflect the light emitted from the light source 12 in the bottom and lateral directions, and directing the light towards the liquid crystal display panel 2.

The diffusion plate 13 is provided over the light source 12, and is to diffuse the light emitted from the light source 12 and the light reflected on the reflector plate 11 so as to make the luminance uniform. The diffusion plate 13 used in this embodiment is a relatively thick one, having light-diffusing particles dispersed in a light-transmissive material.

The beam-condensing sheet 14 corresponds to the optical sheet according to the present invention, and improves directionality, for example, of the illuminated light, by being disposed over the diffusion plate 13. Details of configuration of the beam-condensing sheet 14 will be described later.

The diffusion sheet 17 is provided over the beam-condensing sheet 14, and is to allow the light once improved in the directionality by the beam-condensing sheet 14 to emit therethrough, after being diffused within a predetermined angular range. The diffusion sheet 17 adopted in this embodiment is such as being provided with a diffusion plane having a light-diffusing irregularity structure or the like on the light emission surface side of the light-transmissive sheet base.

The reflection-type polarizer 18 is provided over the diffusion sheet 17, and is to allow only one of orthogonal polarization components of the light diffused by the diffusion sheet 17 to pass therethrough, and reflecting the other. The direction of vibration of the polarization component transmitting through the reflection-type polarizer 18 is set in parallel with the transmission axis of the polarizer plate 2a disposed on the light incidence side of the liquid crystal display panel 2.

Next paragraphs will detail the configuration of the beam-condensing sheet (optical sheet) 14 according to the embodiment of the present invention.

Figure 2A:
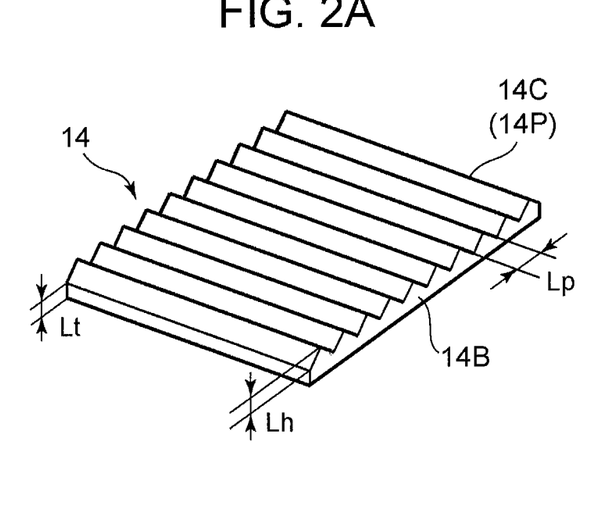
FIG. 2A shows an embodiment having, as a beam-condensing layer, irregularity portions based on a prism structure.
Figure 2B:
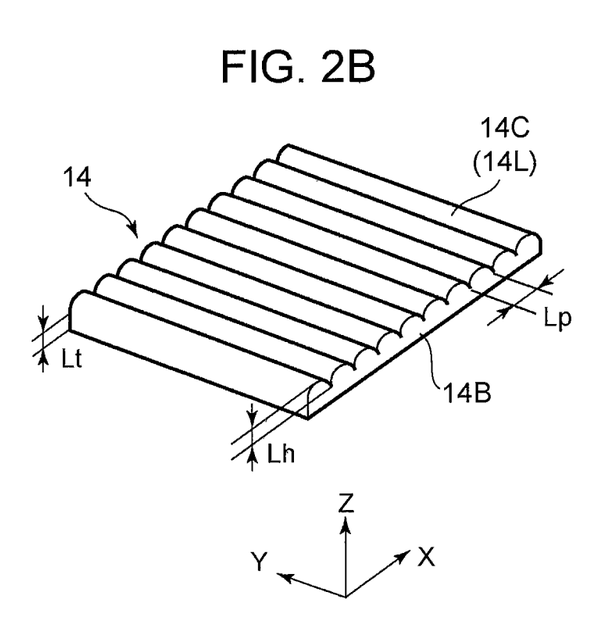
FIG. 2B shows an embodiment having, as a beam-condensing layer, irregularity portions based on a cylindrical lens structure.

FIGS. 2A and 2B are perspective views schematically showing exemplary configurations of the beam-condensing sheet as the optical sheet 14 according to embodiments of the present invention. The beam-condensing sheet 14 has a nearly rectangular sheet geometry, and is configured by a prism sheet or a lens sheet having a large number of irregularity portions 14C with a beam-condensing function successively arranged in one direction (X-direction in the drawing) on one main surface (light emitting surface) of the light-transmissive base 14B.

The beam-condensing sheet 14 includes not only those having the base 14B and the irregularity portions 14C formed in an integrated manner by casting, hot press, fusion-extrusion molding and the like, but also includes those formed by the transfer method by which the irregularity portions 14C composed of an ultraviolet curing resin are cured on the base 14B and allowed to adhere thereon. The base 14B and the irregularity portions 14C are composed of a transparent resin such as polycarbonate, polyethylene terephthalate, polyethylene naphthalate, acrylic resin or the like. It is to be understood now that the irregularity portions 14C include both of prism component 14P and cylindrical lens component 14L as described later.

The beam-condensing sheet 14 shown in FIG. 2A has a large number of prism components 14P having a triangle section, formed as the irregularity portions 14C, arranged on the surface on the light emission side thereof. The beam-condensing sheet 14 shown in FIG. 2B has a large number of cylindrical lens components 14L having a hyperbolic plane, a parabolic plane or an aspherical plane of higher orders, formed as the irregularity portion 14C, arranged on the surface on the light emission side thereof.

On the other hand, the cylindrical lens components 14L are formed as having a sectional geometry expressed by a laterally-symmetrical hyperbolic or parabolic contour, which satisfies the equation (1) below, assuming Z-axis in parallel with the direction of the normal line on the optical sheet, assuming X-axis in the direction of the row of the cylindrical lens component, and assuming Y-axis in the direction of the generatrix of the cylindrical lens components 14L, so as to give a finite focal length on the emission side of the illumination light:

$$Z=X^2/(R+\sqrt{(R^2-(1+K)X^2)}) \quad (1)$$

where, R represents radius of curvature [μm] of the end apex, and K represents conic constant. It is to be noted that a symbol "√" used in this patent specification means a square root of a value determined by a mathematical expression following thereafter.

In another case, the cylindrical lens components 14L are formed as having a sectional geometry expressed by a laterally-symmetrical aspherical contour, which satisfies the equation (2) below, assuming Z-axis, X-axis and Y-axis similarly to those as described in the above, so as to give a finite focal length on the emission side of the illumination light:

$$Z+X^2/(R+\sqrt{(R^2-(1+K)X^2)})+AX^4+BX^5+CX^6+ \quad (2)$$

where R represents radius of curvature [μm] of the end apex, K represents conic constant, and each of A, B, C . . . represents aspherical coefficient.

The beam-condensing sheet 14 is configured as having the irregularity portions 14C arranged at a pitch (lens pitch) Lp in the range from 110 μm to 330 μm, both ends inclusive. The upper limit of the lens pitch Lp will be explained below, referring to FIG. 3.

Figure 3:
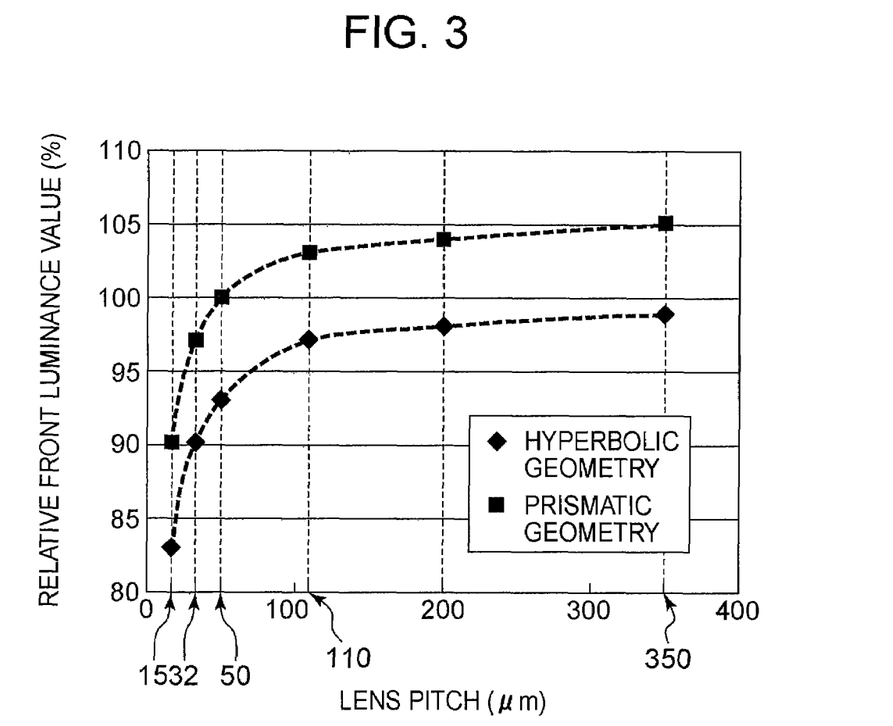
FIG. 3 is a graph showing exemplary relations between the lens pitch of the beam-condensing sheet and front luminance.

FIG. 3 shows exemplary relations between the lens pitch of the beam-condensing sheet 14 and the resultant front luminance. The abscissa plots the lens pitch [μm], and the ordinate plots the front luminance expressed as relative values to the luminance of a prism sheet having prism components with an angle of apex of 90°, arranged at a 50μm pitch. The lens pitch on the abscissa is expressed by a logarithmic scale.

FIG. 3 shows data of the prism sheet having the prism components having an angle of apex of 90°, and data of the lens sheet having the cylindrical lens components 14L having the hyperbolic geometry expressed by the equation (1) in the above. It is found that there are increasing tendencies of the front luminance as a whole, as the lens pitch increases. The luminance of the lens sheet is lower than the luminance of the prism sheet under the same lens pitch, because the apex of the lens components 14L is rounded unlike the prism components 14P. Such rounding of the apex of the lenses causes larger influences as the lens pitch becomes smaller, and results in lowering in the luminance, but expansion of the lens pitch can moderate the influences due to rounding of the apex of the lenses.

As can be found in FIG. 3, the luminance can be improved by expanding the lens pitch. The rate of improvement in the luminance, however, becomes dull as the lens pitch grows larger, and saturates at around 330 μm. In other words, the lens pitch expanded to as large as 330 μm or beyond results in only a small effect of improvement in the luminance. It is therefore preferable to set the maximum value of the lens pitch to 330 μm or around, in view of the rate of improvement in the luminance.

Figure 4:
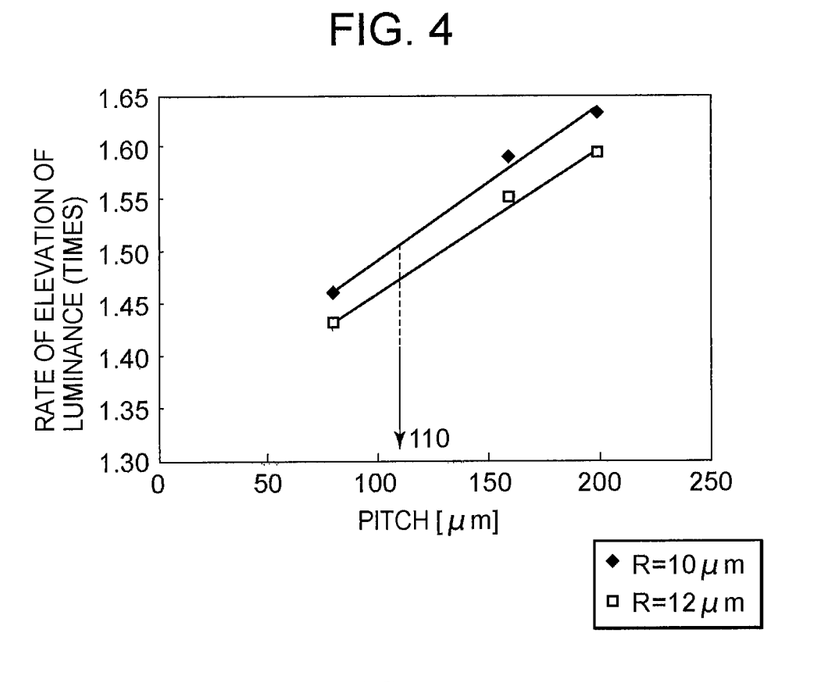
FIG. 4 is a graph showing experimental results expressing relations between the lens pitch of the beam-condensing sheets and the front luminance.

The lower limit of the lens pitch Lp will be explained below, referring to FIG. 4. FIG. 4 shows experimental results expressing relations between the lens pitch of the lens sheet having the cylindrical lens components 14L having a hyperbolic geometry expressed by the equation (1) in the above, and the rate of elevation of the luminance. In this experiment, measurement was made on to what degree the front luminance obtained by a configuration having only the diffusion plate and the beam-condensing sheet (lens sheet in this embodiment) 14 are disposed was improved as compared with the front luminance obtained by a configuration having only the diffusion plate 13 disposed between the light source 12 and the liquid crystal display panel 2, as will be understood by referring to FIG. 1. The abscissa in the drawing plots the lens pitch [μm], and the ordinate plots the rate of elevation of the luminance assuming the value for the case without the lens sheet as 1.

The diffusion plate applicable herein includes those composed of polycarbonate resin, acrylic resin, styrene resin, acrylonitrile-butadiene-styrene resin, acryl-styrene resin, cycloolefinic resin (under commercial names of Zeonor resin (registered trademark of Zeon Corp.), Arton resin (registered trademark of JSR Corp.), etc.), given with surface-diffusive geometry, or those having organic particles such as acrylic particles and styrene particles, or inorganic particles such as silica, alumina, titanium oxide, mixed with the above-described materials. Use of any material yields similar results.

FIG. 4 collectively shows rates of elevation in the luminance of a lens sheet having a radius of curvature R of the lens end of 10 μm, and a lens sheet having a radius of curvature R of the lens end of 12 μm. It is found that there are generally increasing tendencies of the front luminance as the lens pitch grows larger. The lens sheet of R=12 μm showed the luminance smaller than that of the lens sheet of R=10 μm under the same lens pitch, because the degree of rounding of the apex of the lenses is larger. Such rounding of the apex of the lenses causes larger influences as the lens pitch becomes smaller, and results in lowering in the luminance, but expansion of the lens pitch can moderate the influences due to rounding of the apex of the lenses.

The beam-condensing sheet 14 is generally disposed on the diffusion plate 13, in order to improve the front luminance. Disposition of the beam-condensing sheet 14 therefore becomes less meaningful, unless a certain level of improvement in the luminance can be obtained. For this reason, the present invention is configured so that the beam-condensing sheet 14 is demanded to ensure the effect of improvement in the luminance, such as shown in FIG. 4, by a factor of 1.5 or more, and so that the beam-condensing sheet 14 has a lens pitch and a lens geometry capable of satisfying the condition. In this example, the lower limit of the lens pitch is determined as 110 μm, for the hyperbolic cylindrical lens sheet having a radius of curvature of the end portion of 10 μm or smaller.

The rate of elevation in the luminance by a factor of 1.5 or around has been achieved in related arts by using a plurality of sheets similar to the diffusion sheet 17 explained referring to FIG. 1, but use of the beam-condensing sheet 14 makes it no more necessary to dispose such plurality of diffusion sheets.

Figure 5:
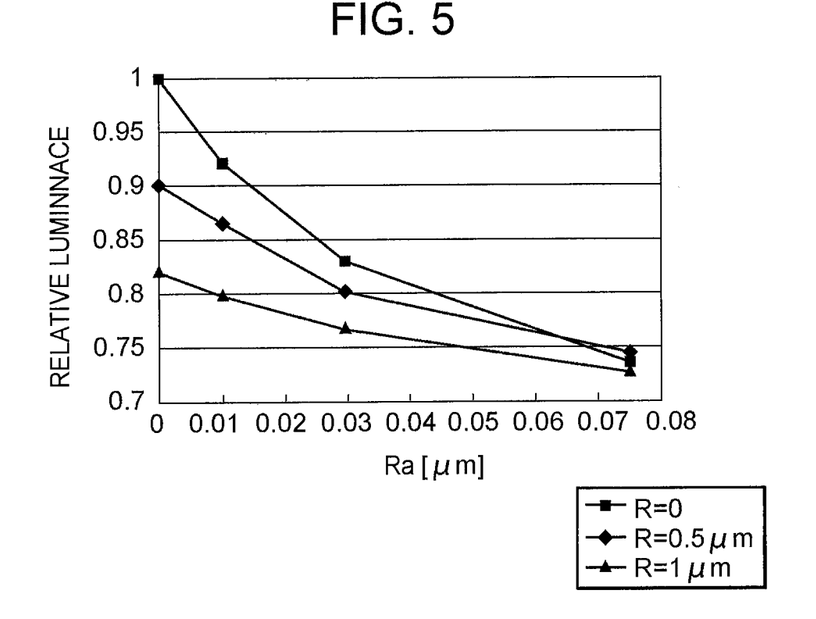
FIG. 5 is a graph showing results of simulation expressing relations between surface roughness of irregularity portions and the front luminance.

Luminance characteristics of the beam-condensing sheet 14 are largely affected not only by the lens pitch Lp, but also by the roughness of the surface (lens surface) of the irregularity portions 14C. FIG. 5 shows results of simulation expressing relations between the surface roughness (Ra) of the irregularity portions 14C and the relative luminance. Three samples basically having the prism components with an angle of apex of 90°, and each having a radius of curvature R of the end portion of 0, 0.5 and 1.0 were used. The abscissa plots the surface roughness (Ra) [μm], and the ordinate plots the relative luminance assuming the luminance of a sample with R=0 and Ra=0 as 1.

As is evident from FIG. 5, all samples showed decreasing tendencies of the resultant luminance as the surface roughness (Ra) of the irregularity portions increased. The surface roughness is therefore limited to the range of Ra≤0.1 μm (100 nm), and more preferably to the range of Ra≤0.05 μm (50 nm). The limitation can prevent the luminance from being lowered.

As has been described in the above, the beam-condensing sheet 14 having excellent luminance characteristics can be obtained by adjusting the pitch of arrangement of the irregularity portions 14C (lens pitch) to the range from 110 μm or more but 330 μm or less, both ends inclusive, and by adjusting the surface roughness (Ra) of the irregularity portions 14C to 0.1 μm or smaller.

It is to be understood herein that the lens pitch can be expressed also by the total number of the irregularity portions per unit length. The total number of ridgelines and valleys of the irregularity portions 14C per 1 mm falls in the range from 6.06 to 18.2 [/mm], under a lens pitch of 110 μm or more and 330 μm or less, both ends inclusive.

The irregularity portions 14C will be detailed in the next.

Figure 6A:
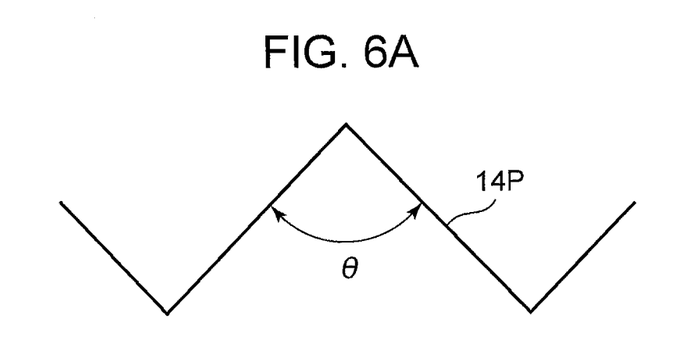
FIGS. 6A and 6B are schematic side elevations of the prism components composing the irregularity portions.

FIG. 6A shows a sectional geometry of the prism component 14P. The prism component 14P has an isosceles triangular section, with an angle between a pair of slopes of the prism component, or apex θ, of 70° to 110°, both ends inclusive, preferably 85° to 95°, both ends inclusive, and more preferably 90°.

Figure 6B:
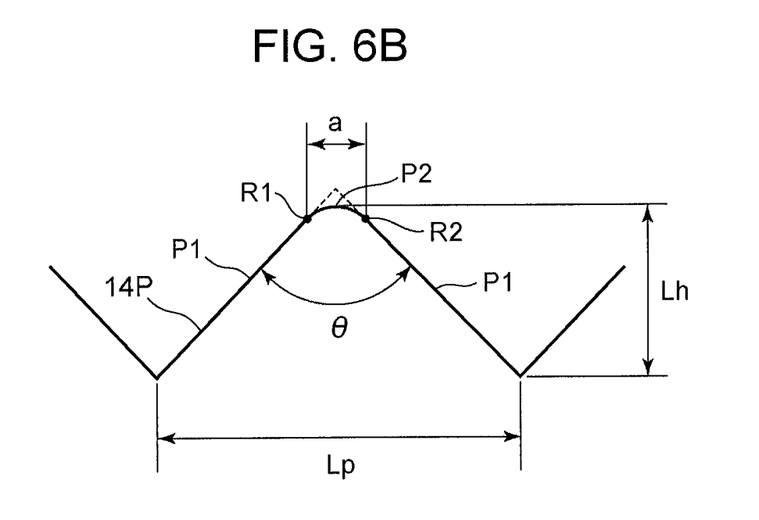

The prism component 14P may be formed also according to the geometry shown in FIG. 6B. The prism component 14P shown in FIG. 6B has a rounded geometry at the end portion thereof. In this case, when the length of a line connecting, in the width-wise direction, both intersections R1, R2 respectively formed by a pair of straight lines P1, P1 composing the slopes of the prism component and a curve P2 composing the end portion is assumed as width of chord "a" [μm], and when the lens pitch is assumed as Lp [μm], the prism components 14P are configured so as to satisfy the relation of a/Lp≤0.18. In other words, the prism components 14P are configured so that the width of chord "a" accounts for 18% or smaller of the pitch of arrangement (lens pitch). For a case where the curved surface to which the curve P2 belongs is a spherical surface, the width of chord "a" is defined as doubled radius of curvature thereof. By adopting such configuration, the angle of view can be improved, while keeping the front luminance at a certain level which is expressed by the rate of elevation in luminance by a factor of 1.5 or above as shown in FIG. 4.

Figure 7:
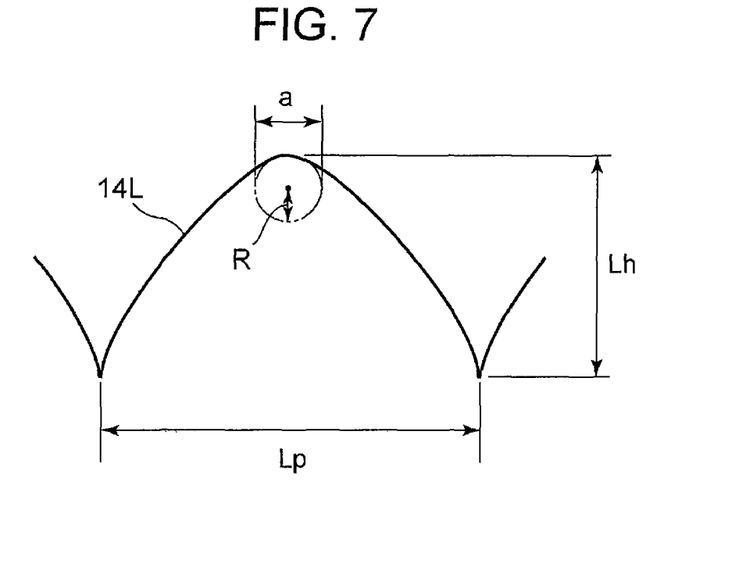
FIG. 7 is a schematic side elevation of the lens component composing the irregularity portions.

On the other hand, FIG. 7 shows an exemplary sectional geometry of the cylindrical lens component 14L. The lens component 14L has a curved surface portion expressed by a certain radius of curvature R [μm] at an end portion (apex)

thereof. In this case, the lens component 14L is formed so that doubled radius of curvature (2R) of the lens component 14L corresponds to the width of chord "a" [μm] of the lens component 14L, and so that a/Lp≤0.18 is satisfied in conjunction with the lens pitch Lp [μm]. By adopting such configuration, the angle of view can be improved, while keeping the front luminance at a certain level which is expressed by the rate of elevation in luminance by a factor of 1.5 or above as shown in FIG. 4.

The lens component 14L shown in FIG. 7 is configured so as to satisfy the relation R/Lh≤0.40, assuming the radius of curvature of the end portion as R [μm], and the lens height (height of irregularity portion 14C) as Lh. By adjusting the radius of curvature of the end portion of the lens to as large as 40% or below of the lens height, the angle of view can be improved, while keeping the front luminance at a certain level which is expressed by the rate of elevation in luminance by a factor of 1.5 or above as shown in FIG. 4.

As for the prism component 14P having a curved surface geometry at the end portion thereof as shown in FIG. 6B, the prism component 14P is configured similarly so as to satisfy the relation R/Lh≤0.40 in conjunction with the lens height Lh, also for the case where the curved surface geometry is a spherical surface geometry, assuming the radius of the spherical surface as R.

Figure 8:
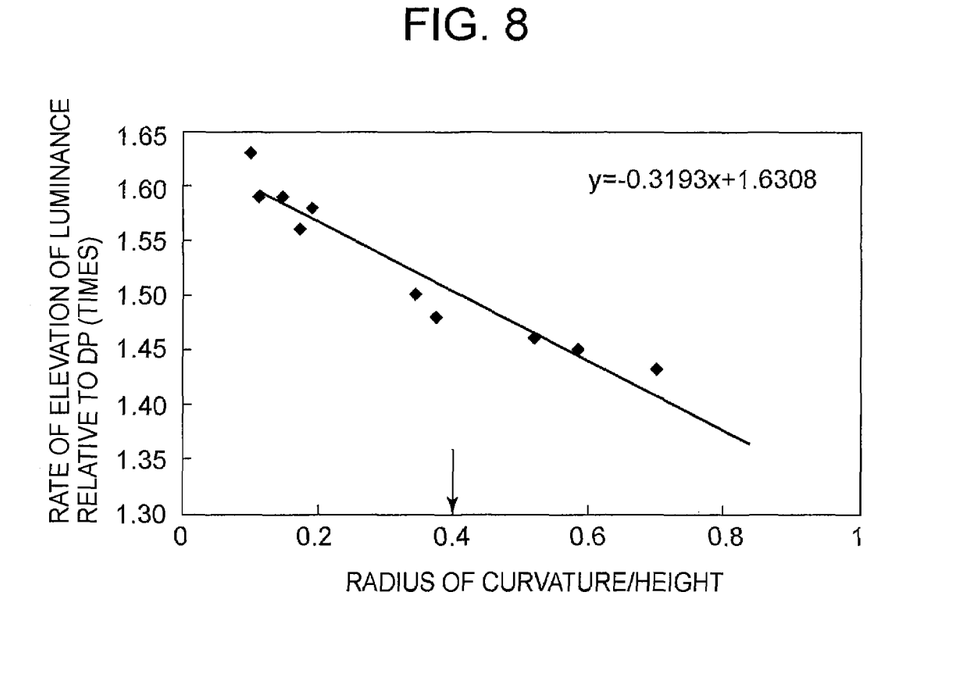
FIG. 8 is a drawing showing experimental results expressing ratio of radius of curvature of the end portion to the lens height component, in relation to the front luminance.

The individual relational expressions of a/Lp≤0.18 and R/Lh≤0.40 will be explained in the next. FIG. 8 shows experimental results expressing the front luminance characteristics of a plurality of hyperbolic cylindrical lens sheets made of polycarbonate, fabricated as being differed from each other in the geometry. In FIG. 8, the abscissa plots the ratio (R/Lh) of the radius of curvature R of the end portion of the lens component to the lens height Lh, and the ordinate plots the rate of elevation of the luminance over the luminance value obtained for the diffusion plate only, corresponding to the ordinate in FIG. 4. An approximate expression calculated based on the individual plots, assuming the abscissa as x, and the ordinate as y, was given as function y=−0.3193x+1.6308.

In the hyperbolic cylindrical lens sheet, the width of chord "a" is approximately twice as large as the radius of curvature R, and the lens height Lh is approximately 0.45 times as large as the lens pitch. It is therefore concluded that, as explained referring to FIG. 4, the hyperbolic cylindrical lens sheet capable of ensuring the rate of elevation in luminance by a factor of 1.5 or around is a lens component having a lens pitch Lp of 110 μm and having a radius of curvature R of the end portion of 10 μm, wherein a/Lp (nearly equal to 2R/Lp) in this case has a value of approximately 0.18. On the other hand, a value of 2R/Lh is given as approximately 0.40.

As has been described in the above, it is concluded that the lens sheet composed of the lens component satisfying the individual relations of a/Lp≤0.18 and R/Lh≤0.40 can ensure the front luminance expressed by the rate of elevation of luminance by a factor of 1.5 or more. It is also concluded that the viewing angle characteristics can be improved, since the end portion of the lens is configured as having a curved surface geometry. In view of substantializing the effect of improving the angle of view, the width of chord "a" is preferably adjusted to 3% or more of the lens pitch Lp. In other words, it is preferably to satisfy 0.03≤(a/Lp)≤0.18.

The lens pitch and rigidity or stiffness of the sheet will be explained in the next.

Expansion of the lens pitch, while keeping the lens geometry unchanged, makes the lens height large, and such expansion of the lens pitch increases the ratio of the base thickness to the lens height, if the base thickness is kept constant. In this case, the rigidity of the entire lens sheet, in particular the rigidity in the width-wise direction of the lens, tends to lower as the lens pitch increases, so that the sheet becomes more likely to cause deflection (waviness), and consequently degrades the handlability. Lack of rigidity of the sheet may also be causative of waviness due to heat of the backlight in service, and this may disturb the light-condensing characteristics, and may thereby degrade the image quality.

Therefore in this embodiment, deflection of the sheet is suppressed by setting the upper limit to the ratio of the base thickness of the sheet to the lens height. The lens height is more preferably adjusted to 50% or less of the base thickness. It is therefore made possible to afford enlargement of the sheet size.

Figure 9:
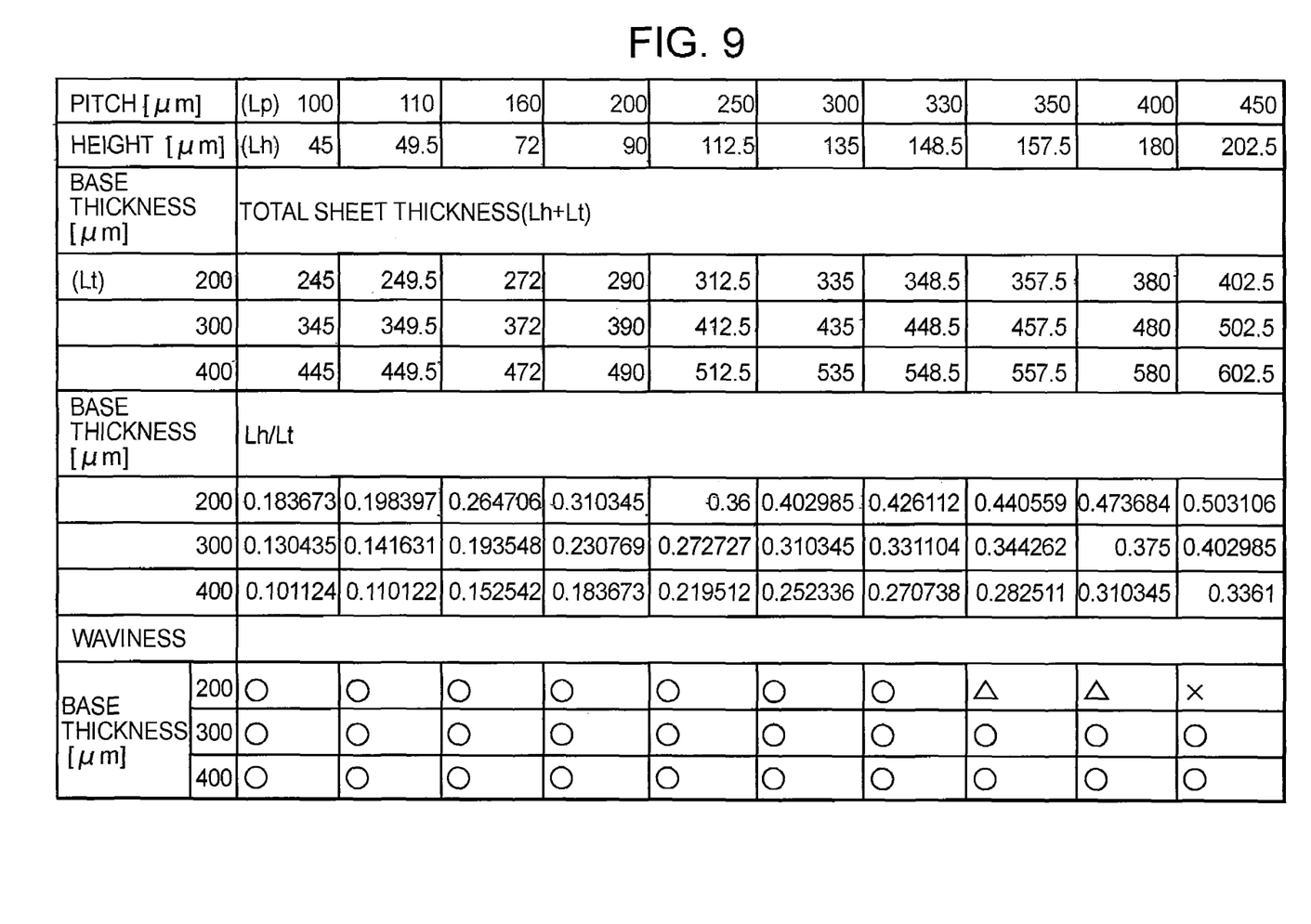
FIG. 9 is a table showing experimental results expressing ratio of lens height to the base thickness of the beam-condensing sheet, in relation to occurrence of waviness.

FIG. 9 shows experimental results of occurrence of waviness in the samples fabricated as being differed in the lens pitch and the base thickness. The lens pitch Lp of the lens sheet was adjusted to 100 μm, 110 μm, 160 μm, 200 μm, 250 μm, 300 μm, 330 μm, 350 μm, 400 μm or 450 μm, the lens height Lh was adjusted to approximately 0.45 times as large as the lens pitch Lp, and the base thickness Lt was adjusted to 200 μm, 300 μm or 400 μm. The waviness was evaluated as "○" for those showing no waviness, as "×" for those found through the panel to show waviness (causing disturbance of the light-condensing property, and consequently degrading the image quality), and as "Δ" for those found to produce waviness although not so severe as degrading the image quality.

By calculating the ratio (Lh/Lt) of the lens height to the base thickness, and by placing a focus on occurrence of waviness, it is found that the waviness accompanied by degradation in image quality can be suppressed by satisfying Lh/Lt≤0.5, that is, by adjusting the lens height to not larger than 50% of the base thickness. It is therefore made possible to ensure the rigidity at a level enough for preventing degradation in the image quality ascribable to the waviness, by adjusting the lens height to not larger than 50%, and preferably not larger than 40%, of the base thickness.

Figure 10:
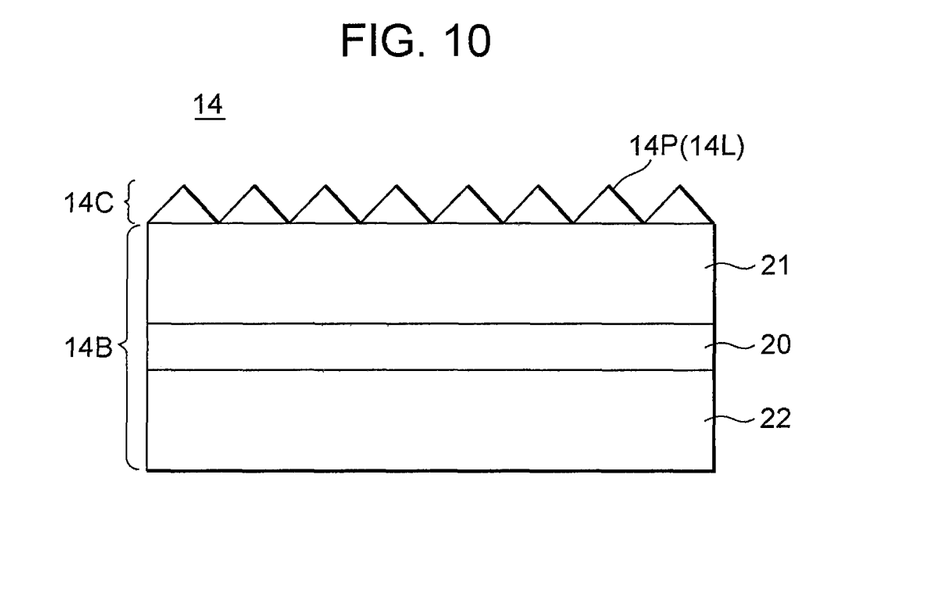
FIG. 10 is a schematic side elevation showing another exemplary configuration of the beam-condensing sheet.

If difficulty arises, as the lens pitch expands, in achieving the base thickness sufficient for supporting the lenses by a single layer, it is effective to compose the base using a stack of two or more layers of light-transmissive sheet. FIG. 10 is a side elevation of the beam-condensing sheet 14 schematically showing an exemplary configuration thereof. The beam-condensing sheet 14 shown in FIG. 10 is composed of a first sheet base 21 supporting the lenses (irregularity portions) 14C, and a second sheet base 22 opposed to the first sheet base 21 while placing an adhesive material layer 20 in between. By configuring the base 14B of the beam-condensing sheet 14 using a stack of the first and the second sheet bases 21, 22, the rigidity of the base 14B can be ensured, the handlability can be improved by preventing waviness of the beam-condensing sheet 14, and thereby the image quality can be prevented from degrading.

Materials composing the first and the second sheet bases 21, 22 are not specifically limited so far as they are light-transmissive, and applicable examples include not only resin sheets composed of polycarbonate, PET and acrylic resin, but also plastic plate and glass plate. The adhesive material layer 20 can be configured using ultraviolet curing adhesive, pressure-sensitive adhesive, hot-melt adhesive or the like. The refractive index of the adhesive material layer 20 is preferably equivalent to, or smaller than the refractive indices of the first and second sheet bases 21, 22.

In general, resin materials tend to cause yellowing under excessive ultraviolet irradiation. The sheet in this case can no more keep a desired light transmission property, because the light transmitting therethrough will be affected by such coloration of the sheet. More specifically, blue wavelength component in the transmitted light decreases. Then, addition of an ultraviolet absorber to at least one of the first and second sheet bases 21, 22 can suppress yellowing of the sheet base induced by ultraviolet irradiation.

It is also allowable herein to add, to the adhesive material layer, a blue dye in place of, or together with, the ultraviolet absorber. Coloration of the first sheet base 21 can therefore be corrected, and modulation of light transmitted through the sheet can consequently be prevented.

For the purpose of suppressing warping of the sheet after stacking, it is preferable to take molecular alignment of the first and second sheet bases into consideration. More specifically, the angle formed between directions of molecular alignment of the individual sheet bases is set to 20° or smaller. Making the thickness of the individual sheet bases equivalent, or adopting a configuration in which one sheet base accounts for a substantial portion of the total thickness of the sheet, is also effective in view of suppressing warping of the sheet.

The thickness of the first and second sheet bases 21, 22 is not specifically limited, in which the thickness of the individual sheets is appropriately selectable so that a target thickness of the sheet can be obtained after stacking, typically within the range from 50 μm to 500 μm, both ends inclusive. In view of preventing warping of the base 14B after stacking, it is preferable to make the thickness of the first and second sheet bases 21, 22 equivalent to each other, or by adopting a configuration in which the thickness of one sheet base accounts for a substantial portion of the total thickness of the sheet.

For an exemplary case where both of the first and second sheet bases 21, 22 are composed of the same material, the warping can be suppressed by making these sheet bases have the same thickness. On the other hand, for a case where the first and second sheet base 21, 22 are composed of different materials, warping may occur even under an equivalent thickness. In this case, it is preferable to balance the thickness depending on combination of the materials. For an exemplary case where the first sheet base 21 is composed of polycarbonate, and the second sheet base 22 is composed of polyethylene terephthalate, the ratio of thickness of the first sheet base 21 and the second sheet base 22 is adjusted to 6:4 or around.

The first sheet base 21 also varies the rigidity, depending on the lens pitch. More specifically, under a constant thickness of the sheet, the rigidity in the direction of arrangement of the irregularity portions 14C tends to decrease as the lens pitch becomes larger. Therefore, the rigidity of the beam-condensing sheet 14 can be kept at an appropriate level, by optimizing the thickness of the first sheet base 21 and the second sheet base 22, depending on the lens pitch.

Figure 11:
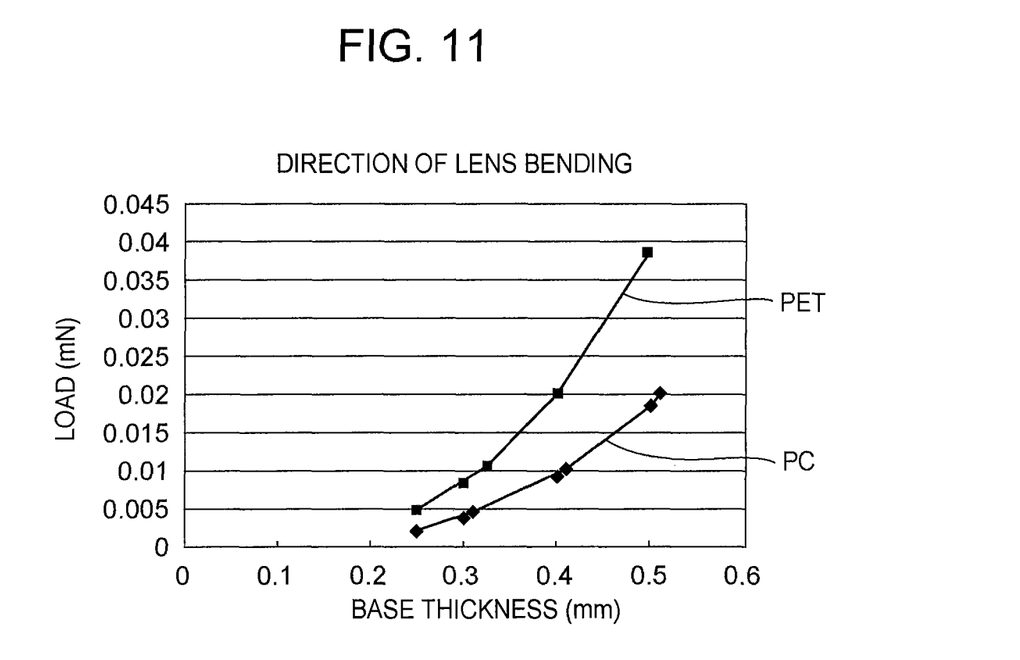
FIG. 11 is a graph showing experimental results expressing relations between the base thickness of the beam-condensing sheet and the bending stiffness of the lens component.

Moreover, the rigidity may vary depending also on species of the resin. FIG. 11 shows relations between the base thickness and the bending stiffness in the direction of bending lenses. PET is found to be higher in the bending stiffness than polycarbonate (PC). By considering such material-specific bending stiffness in the material selection for the first and second sheet bases 21, 22, the rigidity of the beam-condensing sheet 14 can be optimized.

Figure 12A:
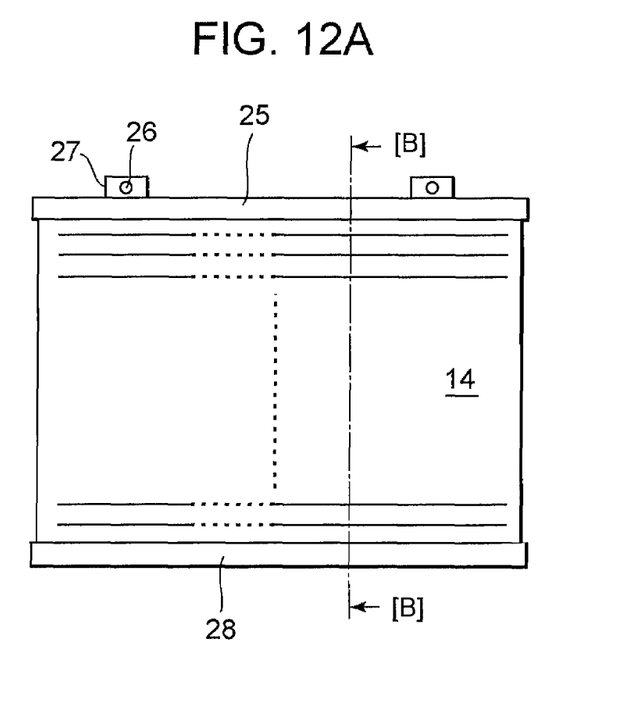
FIG. 12A is a front elevation.
Figure 12B:
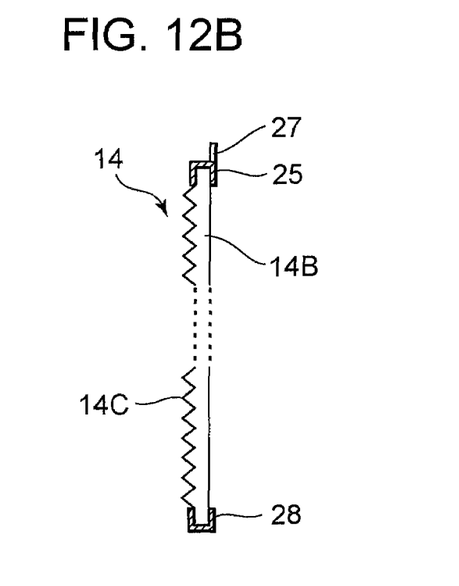
FIG. 12B is a sectional view taken along line [B]-[B] in FIG. 12A.

On the other hand, another technical means for avoiding lowering in the rigidity of sheet caused by expansion of the lens pitch is exemplified by a configuration typically shown in FIGS. 12A and 12B. In the example shown in the drawing, a reinforcing component 25, typically composed of a metal or the like having sufficient levels of strength and heat resistance for keeping the flatness of the base 14B, is provided to a region which forms the upper rim portion of the base 14B when the beam-condensing sheet 14 is in service. The reinforcing component 25 composes the "reinforcing portion" of the embodiment of the present invention, for keeping the flatness of the base 14, by being attached so as to hold the upper rim of the base 14. It is also allowable to configure the reinforcing portion by partially thickening the upper rim of the base 14, in place of attaching the reinforcing component 25.

The optical sheet such as the beam-condensing sheet is generally incorporated as being hung from a frame portion inside the backlight unit or the liquid crystal display device. The sheet, however, becomes more likely to deflect under lowered rigidity thereof due to expansion of the lens pitch, and degrades the workability in the process of assembly. It is also anticipated that, during the time in use after the assembly, an engagement portion in conjunction with the frame portion, formed on the upper rim of the sheet, may deform due to heat of the backlight to thereby impair the flatness of the sheet. In this case, the flatness of the light-condensing surface cannot be maintained, light-condensing properties of the lenses consequently vary in plane, and the displayed image is degraded in quality.

In contrast, the exemplary configuration shown in FIGS. 12A and 12B can successfully improve the workability in the process of assembly of the backlight or the liquid crystal display device, can prevent thermal deformation of the engagement portion due to heat of the backlight, and can thereby avoid degradation in image quality due to degradation in the flatness of the beam-condensing sheet 14, by providing engagement tabs 27, each having an engagement hole 26 allowing therethrough engagement with the frame portion, to a portion of the reinforcing component 25 supporting the upper rim of the base 14B as being integrated therewith.

It is also allowable, as shown in FIGS. 12A and 12B, to attach a weight bar 28 to the lower rim of the base 14B, so as to ensure the flatness of the sheet by the self-weight, in a state of hanging of the beam-condensing sheet 14. This configuration is particularly effective for a case where the base 14B of the beam-condensing sheet 14 is too thin, and so that it is difficult to ensure the flatness of the sheet by means of the self-weight of the sheet per se.

The beam-condensing sheet 14 of this embodiment further has, on the back surface thereof allowing therethrough incidence of light, in other words, on the other main surface on the opposite side of one main surface having the irregularity portion 14C of the base 14B formed thereon, micro-projections for roughening the other main surface.

The height of the projections is not specifically limited, but preferably adjusted to 0.20 μm or higher above the average center level (JIS B0601-1994). The density of the projections having a height of 0.20 μm or higher above the average center level preferably falls in the range of 70/mm$^2$ or more and 400/mm$^2$ or less. By adjusting the density of projections to 70/mm$^2$ or higher, blurring in the appearance due to interference with the flat portion of the diffusion plate 13 disposed on the back surface side of the beam-condensing sheet 14 can be improved. By adjusting the density of projections to 400/mm$^2$ or lower, lowering in the luminance of the liquid crystal display device, caused by provision of the projections on the back surface side of the beam-condensing sheet 14, can be suppressed.

Average distance between every adjacent projections having a height of 0.20 μm above the average center level is not specifically limited, but is preferably adjusted typically to 50 μm or more and 120 μm or less. By adjusting the average distance of the projections to 50 μm or larger, lowering in the luminance of the liquid crystal display device, caused by provision of the projections on the back surface side of the beam-condensing sheet 14, can be suppressed. By adjusting the average distance of the projections to 120 μm or smaller, the surface of the diffusion plate 13 can be prevented from being scratched due to contact with the back surface of the beam-condensing sheet 14, and blurring in the appearance due to interference with the flat portion of the diffusion plate 13 can be improved.

The projections on the back surface (light incidence surface) of the beam-condensing sheet 14 are preferably provided so as to adjust the haze of the beam-condensing sheet to not larger than 20% in the state having no irregularity portion 14C formed thereon. It is also preferable that the average slope of the back surface of the beam-condensing sheet 14, having the projections formed thereon, is adjusted to 0.25 rad or smaller.

Figure 13:
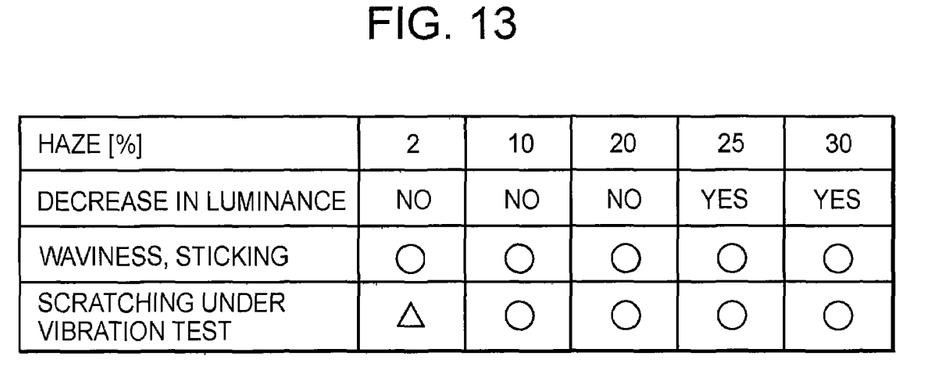
FIG. 13 is a table showing experimental results expressing relations among possibility of lowering in the haze value and luminance of sheet caused by formation of micro-projections on the back surface of the beam-condensing sheet, waviness, and susceptibility to scratching in a vibration test.

FIG. 13 is a drawing showing results of evaluation of a plurality of beam-condensing sheets prepared therefor, having different haze values, individually in terms of luminance characteristics, waviness or sticking, and possibility of scratching on the back surface side of the sheet under a vibration test. Samples having haze values of exceeding 20% showed lowering in the luminance, whereas lowering in the luminance was not observed for the samples having haze values of not larger than 20%. It is also understood that, by forming the projections on the back surface of the sheet, sticking to other components and the resultant waviness, and scratching on the back surface of the sheet due to vibration can be suppressed. It was also confirmed that a haze of 2% or smaller resulted in a reduced effect of preventing scratching on the back surface of the sheet. The waviness was evaluated as "o" for those showing no waviness, as "x" for those found through the panel to show waviness (causing disturbance of the light-condensing property, and consequently degrading the image quality), and as "Δ" for those found to produce waviness although not so severe as degrading the image quality.

As has been described in the above, the luminance can be improved as compared with the conventional level, and can achieve rigidity and luminance up to levels affording enlargement of the sheet size as a result of enlargement of the screen size.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A beam-condensing optical sheet comprising:
a plurality of irregularity portions arranged on one main surface of a light-transmissive base, the irregularity portions having:
(a) a width of 110 μm or more and 330 μm or less;
(b) a surface roughness of 0.1 μm or less;
(c) a height not larger than 50% of a thickness of the light-transmissive base; and
(d) an arrangement pitch equal to the width.

2. The beam-condensing optical sheet of claim 1, wherein each of the irregularity portions is a prism component having a triangle section.

3. The optical sheet as claimed in claim 1, wherein:
the irregularity portion is a cylindrical lens component having a hyperbolic plane or a parabolic plane, and the sectional geometry of the cylindrical lens component satisfies a following equation, assuming Z-axis in parallel with a direction of a normal line on the optical sheet, and assuming X-axis in a direction of row of the cylindrical lens component:

$$Z=X^2/(R+\sqrt{(R^2-(1+K)X^2)})$$

where, R represents a radius of curvature of an end apex, and K represents a conic constant.

4. The optical sheet as claimed in claim 1, wherein:
the irregularity portion is a cylindrical lens component having an aspherical plane of higher orders, and
the sectional geometry of the cylindrical lens component satisfies a following equation, assuming Z-axis in parallel with a direction of a normal line on the optical sheet, and assuming X-axis in a direction of row of the cylindrical lens component:

$$Z=X^2/(R+\sqrt{(R^2-(1+K)X^2)})+AX^4+BX^5+CX^6+$$

where R represents radius of curvature of an end apex, K represents conic constant, and each of A, B, C . . . represents aspherical coefficient.

5. The beam-condensing optical sheet of claim 1, wherein:
(a) each of the irregularity portions has a curved geometry at an end portion thereof; and
(b) the end portion has a width of chord of not larger than 18% of the width of the irregularity portion.

6. The optical sheet as claimed in claim 1, wherein:
the irregularity portion has an aspherical geometry at the end portion thereof, and
the end portion has a radius of curvature of not larger than 40% of the height of the irregularity portion.

7. The beam-condensing optical sheet of claim 1, wherein the base is composed of a stack of light-transmissive sheets bonded to each other while placing an adhesive material layer in between.

8. The beam-condensing optical sheet of claim 7, wherein the stack is composed of:
(a) a first sheet base supporting the irregularity portions; and
(b) a second sheet base opposed to the first sheet base while placing the adhesive material layer in between.

9. The beam-condensing optical sheet of claim 8, wherein at least one of the first sheet base and the second sheet base is added with an ultraviolet absorber.

10. The beam-condensing optical sheet of claim 1, wherein the base has a reinforcing portion maintaining a flatness of the base, provided at least at part of a circumference thereof.

11. The beam-condensing optical sheet of claim 10, wherein the reinforcing portion is a reinforcing component attachable to an upper rim of the base, when the optical sheet is in service.

12. A back-light device comprising:
a light source; and
an optical sheet configured to adjust light emitted from the light source, the optical sheet having a plurality of irregularity portions arranged on one main surface of a light-transmissive base, the plurality of irregular portions having:
(a) a width of 110 μm or more and 330 μm or less; and
(b) a surface roughness of 0.1 μm or less;
(c) an arrangement pitch equal to the width of the irregularity portions; and
(d) a height not larger than 50% of the thickness of the base.

13. A liquid crystal display device comprising:
a liquid crystal display panel having a back side;
a light source disposed on the back side; and an optical sheet disposed between the liquid crystal display panel and the light source, the optical sheet having a plurality of irregularity portions arranged on one main surface of a light-transmissive base, the plurality of irregularity portions having:
(a) a width of 110 μm or more and 330 μm or less; and
(b) a surface roughness of 0.1 μm or less;
(c) an arrangement pitch equal to the width of the irregularity portions; and
(d) a height of not larger than 50% of the thickness of the base.

14. The back-light device of claim 12, wherein:
(a) each of the irregularity portions has a curved geometry at an end portion thereof; and
(b) the end portion has a width of chord of not larger than 18% of the width of the irregularity portion.

15. The liquid crystal display device of claim 13, wherein:
(a) each of the irregularity portions has a curved geometry at an end portion thereof; and
(b) the end portion has a width of chord of not larger than 18% of the width of the irregularity portion.

16. The beam-condensing optical sheet of claim 1, wherein the height is not larger than 40% of the thickness of the light-transmissive base.

* * * * *